(12) United States Patent
Perander et al.

(10) Patent No.: US 7,226,522 B2
(45) Date of Patent: Jun. 5, 2007

(54) METHOD FOR THE PRODUCTION OF A MINERAL FIBRE PRODUCT

(75) Inventors: Michael Perander, Skolmastergrandz (FI); Jean Le Bell, Keskiyöntie (FI)

(73) Assignee: Paroc Oy AB, Vantaa (FI)

( * ) Notice: Subject to any disclaimer, the term of this patent is extended or adjusted under 35 U.S.C. 154(b) by 314 days.

(21) Appl. No.: 10/498,352

(22) PCT Filed: Dec. 19, 2002

(86) PCT No.: PCT/FI02/01046

§ 371 (c)(1),
(2), (4) Date: Jun. 17, 2004

(87) PCT Pub. No.: WO03/053877

PCT Pub. Date: Jul. 3, 2003

(65) Prior Publication Data

US 2005/0028950 A1   Feb. 10, 2005

(30) Foreign Application Priority Data

Dec. 20, 2001 (FI) ................................. 20012526

(51) Int. Cl.
*C03C 25/66* (2006.01)

(52) U.S. Cl. .................... 156/296; 156/308.6; 264/109; 264/123; 65/17.2; 65/30.1; 65/31; 65/395; 65/440

(58) Field of Classification Search ...................... None
See application file for complete search history.

(56) References Cited

U.S. PATENT DOCUMENTS

| | | | |
|---|---|---|---|
| 3,749,638 A | 7/1973 | Renaud et al. | |
| 4,902,560 A * | 2/1990 | Silver | 442/180 |
| 4,933,381 A | 6/1990 | Hager | 523/414 |

FOREIGN PATENT DOCUMENTS

| | | |
|---|---|---|
| JP | 6-57700 | 3/1994 |
| WO | WO 200100916 A1 * | 1/2001 |

* cited by examiner

*Primary Examiner*—Sam Chuan Yao
(74) *Attorney, Agent, or Firm*—Armstrong, Kratz, Quintos, Hanson & Brooks, LLP.

(57) ABSTRACT

The present invention is directed to method of bonding mineral fibers in a mineral fiber material, according to which an acid is applied to the mineral fiber material in an amount sufficient to dissolve mineral material from the fiber to form a silica containing binder on the mineral fiber, and curing the mineral fiber material to bond the fibers.

10 Claims, No Drawings

METHOD FOR THE PRODUCTION OF A MINERAL FIBRE PRODUCT

This application is a 371 of PCT/FI02/01046 filed on Dec. 19, 2002.

FIELD OF THE INVENTION

The present invention is directed to a method for bonding mineral fibres in a mineral fibre material for the production of a bonded mineral fibre product.

BACKGROUND OF THE INVENTION

Mineral fibres made by melting and centrifuging of mineral raw materials, such as stone, slag, glass, ceramics or the like, are extensively used for the manufacture of mineral fibre mats and blankets, primarily for heat and sound insulation purposes, especially within the construction industry. Such mineral fibre products conventionally contain a binder, of which a number of different types are known.

Thus for example, phenol cured insulating products are known. Phenol is a fairly inexpensive and also a rapidly curing binder. A phenol cured product resists temperatures up to 250° C., but the bonds are destroyed if the temperature is maintained above 250° C. for an extended period of time. At higher temperatures, at 400° C. and more, the binder loses its strength, the temperature increases rapidly and the product collapses. In addition, a phenol cured insulating product emits poisonous gases during burning. An additional and also major disadvantage is that the presence of phenol in the product will cause an undesired load on the environment when the binder-containing mineral wool product is to be disposed of after use.

Also water glass has been widely used as a binder. Water glass is traditionally made by melting silica sand with sodium or potassium carbonate at a very high temperature and then dissolving the finely divided solidified product in water. Thus water glass can be considered an ecologically acceptable substance to include as a binder in mineral wool products. A disadvantage is, however, that the manufacture thereof uses pure raw materials and is energy consuming.

It is also known to use a mixture of water glass and clay as a binder for mineral wool products, see e.g. SE 420 488. Such a product, although providing good water and heat resistance, has poor compression resistance, is brittle and causes dusting. The EP B 466 754 on the other hand describes the use of a binder made from slag and water glass for making a temperature and moisture resistant mineral wool product which is also capable of withstanding high temporary loads.

The international application WO 01/00916 discloses a binder for mineral wool products, which is made by dissolving a particulate glassy mineral material in an aqueous solution, nucleating and stabilizing the so obtained solution to form a binder solution in the form of a sol, and applying the so obtained binder to mineral fibres in order to bind the same. The aqueous solution can be an alkaline or an acidic solution. The sol so obtained can be made to gel, either before application, for example by changing pH or adjusting the electrostatic repulsion between the particles in the solution, or gel formation of the sol is brought about after having been applied to the mineral fibres.

The object of the present invention is to provide an easy and economically feasible method for binding mineral wool products, which binder has excellent binding and fire resistant properties and is acceptable from a use or occupational health point of view. An important advantage is that the binder used according to the invention presents no ecological load on the environment, but contains only such components that are already inherently present in the mineral wool product.

SUMMARY OF THE INVENTION

The object of the invention is thus a method of bonding mineral fibres in a mineral fibre material for making a bonded mineral fibre product, according to which method an acid is applied to the mineral fibre material in an amount sufficient to dissolve mineral material from the fibre to form a silica containing binder on the mineral fibre, and curing the mineral fibre material to bond the fibres.

DETAILED DESCRIPTION OF THE INVENTION

According to the invention there is thus provided a method of bonding mineral fibres in a mineral fibre material with a binder, according to which the binder is formed in situ on the fibre by dissolving mineral material therefrom by means of an acid which is applied to the mineral fibre material in an amount sufficient to dissolve mineral material and to form a silica containing dissolved layer on the mineral fibre, and curing the mineral fibre material to bond the fibres.

Thus according to the present invention the mineral fibres are exposed to an acid, preferably as an aqueous solution which is applied as such to the mineral fibres. When in contact with the silicate material of the mineral fibres, the acid dissolves a layer of the fibre, forming a silica containing layer 'in situ' on the fibre surface which gels and binds the fibres together. In the presence of metal cations, for example from the fibre, such silica may form salts, i.e. silicates. In contrast to the teaching of WO 01/00916 there is no need of an additional prior step of dissolving e.g. a particulate silicate material in an aqueous solution, to make a sol, which then is applied to the mineral fibres to provide the binding effect. The invention thus is an important improvement of the process of binding mineral fibres together as eliminating one step in the production process without any detrimental effects on the bonding properties.

An aqueous solution of the acid can be an aqueous solution made acidic by adding any inorganic or organic acid, which is suitable, that is sufficiently strong to dissolve mineral material from the fibre surface. Suitable acids are inorganic acids such as HCl, $HNO_3$, $H_2SO_4$, $H_3PO_4$, etc. Suitable organic acids are e.g. optionally substituted (for example with halogen, such as chlorine) mono-, di- or polycarboxylic acids, especially monoalkanoic acids with 1 to 6, preferably 1 to 3 carbon atoms, such as formic, acetic or propionic acid, or monoalkenoic acids with 3 to 6, preferably 3 to 4 carbon atoms, such as acrylic or methacrylic acid. Examples of suitable dicarboxylic acids are e.g. tartaric and oxalic acid, and of suitable polycarboxylic acids, polyacrylic or polymethacrylic acid. The organic acid can also be an aromatic monocarboxylic acid such as benzoic acid. Preferred acids are such which can be easily evaporated from the product after treatment, such as the organic acids formic acid, acetic acid and propionic acid. Of the mineral acids, hydrochloric acid and nitric acid $HNO_3$ are especially suitable.

The acid is used in an amount which is sufficient to effect a dissolution of an outer layer of the mineral fibres. Such an amount is easily determined by the person skilled in the art and is dependent on the particular acid used, and the strength thereof. Generally an amount which provides appr. 1 to 5% by weight of acid (dry weight) calculated on the fibres is suitable. The acid is preferably applied to the fibres in the form of an aqueous solution of suitable and desired strength. The solution is preferably diluted, but the degree of dilution naturally depends on the acid used, and can be calculated stochiometrically depending on how thick a dissolved layer is desired. A typical dilution would be 1 to 5% acid in water. The amount of water added to the fibres is dictated on the one hand by the desired strength of the solution, and on the other hand by the need to simultaneously obtain sufficient wetting of the fibres, while avoiding inclusion in the product of excessive amounts of water which have to be expelled from the product in a later stage, causing an additional cost or inconvenience. Together with the acid it is possible to use a wetting agent to wet the surface of the fibre, for example a tenside, such as Triton X100 or lauryl sulphate. It is also possible to modify the effect of the acid by using a thickener, for example a polymer, such as a starch, polyethylene oxide, polyethylene glycol, CMC (carboxymethylcellulose), or EHEC (ethyl hydroxy ethyl cellulose) which e.g. can retain moisture and prevent the gelled binder from drying out too rapidly and can thus be used to modify the curing time. The amounts of wetting agents and thickeners to be included can easily be determined by the person skilled in the art.

Usually the pH of the acid used is less than or equal to pH 6 or preferably pH 5, more preferably equal to or less than appr. 3, in order to obtain the desired dissolution of the fibre surface.

In general the conditions relating to the application of the acid, including the strength of the acid and the temperature, should be selected so as to provide a dissolution rate sufficient to dissolve a bonding amount of fibre surface within a specified time period. Such a time period can vary depending on the desired thickness of the dissolved layer, which typically is of the order of a fraction of a μm, such as for example 0.1 μm. Such a time period can be for example up to 20 minutes, e.g. when the acid binder is applied directly to the mineral wool after formation of the mineral wool web. In such a case, the acid will have dissolved a sufficient amount of surface from the fibres to provide a good binding action, before the product is cured. In case more extensive dissolution is desired, the said time period can be longer.

In the curing oven, the heat applied will expel both water and any acid left in the product, the binding process will come to a halt and the dissolved silica will gel and dry to give a satisfying binding effect.

Besides curing in a curing oven, it is also possible to halt the binding process by neutralizing the acid in the mineral wool product, for example by exposing the product to alkaline conditions, such as a gaseous alkaline agent, for example ammonia gas, or by using curing inhibitors, such as alcohols, for example polyethylene glycol.

During the dissolution process of the mineral fibre, the pH increases as the acid is consumed. The degrees of dissolution and thus binding power development can be followed by monitoring the pH of the fibre product. In a simplified manner this can be carried out by soaking a representative amount of bonded fibres in water to measure the pH of the solution so obtained. It is also possible to measure the pH from the product directly, simply by contacting the same with a suitable pH-measuring means. In this manner it is possible, for example, to stop the reaction when the desired pH has been reached.

According to a preferred embodiment, an aqueous solution of the acid is sprayed directly onto the mineral fibre web after production thereof. It is also conceivable to bind the fibres at any other stage during handling of the mineral fibre product, e.g. by spraying, or by dipping or soaking the product in an aqueous solution of the acid. According to a further embodiment of the invention the acid can be in gaseous form the acid fumes being condensed onto the fibres, for example in the presence of water vapor.

As stated above the pH of the acid solution is adjusted suitably according to the desired reaction rates. A low pH value results in rapid dissolution of the mineral material as well as a higher silica concentration in the dissolved layer, as well as a rapid gelling and curing of the silica solution, the gelling time being dependent on the pH, a lower pH resulting in a more rapid gelling than a higher pH. Good dissolution for a wide range of mineral materials is obtained at a pH of 0 to 6.

In the production, the binder solution can be sprayed on the wool through the binder nozzles of the centrifuge used in the mineral fibre production, whereby it is possible to use both peripheral and central sprayers. It is also possible to use two or more different solutions to be fed onto the wool, so that possible modifying and/or additional curing agents are fed through one or more sprayers and the binder solution through a separate sprayer.

As discussed above it is, however, also possible to apply the binder solution to the wool in a subsequent step of the production of the insulating material, for example by spraying it on the primary web on the conveyor, or even at a later stage. It is also possible to apply an additional binder in such a separate and later stage, thus obtaining a material with improved resistance and/or strength. Special properties can be given to the material by applying further additives to the web.

In the mineral fibre products, also additional additives, such as additional curing, modifying, dust binding and hydrophobing agents can be used.

According to the invention, an additional curing agent can consist of mineral salts and compounds, suitable esters or alcohols or of combinations of these. The mineral salts can be e.g. magnesium, aluminium or calcium salts or compounds. Phosphoric acid, for instance, is a usable acid. Buffer curing agents can also be used for adjusting the storage time. The additional curing agent may be a combination of the above mentioned curing agents.

As briefly discussed above, in the mineral fibre product made according to the invention, also various modifying agents such as organic and inorganic polymers, cellulose and silicones, such as silicon organic polymers can be used as additives. Also monomers polymerised by e.g. a pH change or a temperature rise during the curing can be used. By means of the modifying agents one aims at for example improving the elastic properties, the water resistance, carbonation resistance etc. of the binder.

As dust binding agents, alcohols, polyols, polymers, gelling polymers, waxes, resins, oils, fats, paraffines etc. can be used. The task of the dust binding agent is to bind together any dust or to bind it to the main matrice body either physically (film forming) or chemically (surface active properties). In case high temperature curing is used, melting dust binding agents, e.g. stearates, can be used, or curing dust binders, forming a film over the matrice. A great number of the dust binding agents simultaneously have a water repellent effect.

The task of the hydrophobing agent is to prevent water and moisture from penetrating into the product. As hydrophobing agents, silanes, silicones, oils, various hydrophobic compounds and hydrophobic starch can be used.

A polybutene-silane composition has proved especially advantageous as a dust binding agent and a hydrophobing agent. The polybutene component acts as a dust binder and the silane component as a hydrophobing agent.

Such additives are preferably added as an emulsion, which emulsion state is destroyed at higher temperatures thus releasing the various additives at a suitable stage of the production process. For example in this manner curing inhibitors can be released for action at a suitable and desired time in the production process.

According to the invention compatible compounds can be mixed in advance, whereas incompatible compounds have to be mixed immediately before the application or applied through separate nozzles.

The following examples illustrate the invention without being limited in any way.

EXAMPLE 1

10.7 g of a 85% strong formic acid solution was diluted to 500 ml, thus providing an appr. 2% strong solution of formic acid in water. A sample of mineral wool weighing 910 g was separated into individual layers. A layer was sprayed with the solution, whereafter a fresh layer was stacked on top of the sprayed layer, and sprayed in turn. Each layer was sprayed with an amount of acid solution so that the total of 500 ml of acid solution was consumed by the sample of mineral wool. The procedure was continued until all layers had been stacked and sprayed the layers sprayed in turn with the acid solution. The mineral fibre product so obtained was then cured for 5 minutes in a curing oven at a temperature of 190° C. A well-bonded, very coherent product was obtained.

The invention claimed is:

1. A method of bonding mineral fibres in a mineral fibre product such as mineral wool, the method consisting of the following steps:
   (1) applying acid to the mineral wool in an amount sufficient to dissolve mineral material from the mineral fibre to form a silica-containing dissolved layer on a surface of mineral fibre; the ph level being equal to or less than 3;
   (2) arresting the dissolution of the mineral fibre by heating the resultant mineral wool product to evaporate the acid, or by neutralizing the resultant mineral wool product, or by adding a curing inhibitor, preferably an alcohol, such as polyethylene glycol; and,
   (3) curing a resultant mineral wool product from step 1 to bond the fibres; wherein the silica-containing dissolved layer acts as a binder.

2. The method according to claim 1, characterized in that in step (1), an aqueous solution of an acid is applied to the mineral wool.

3. The method according to claim 1 or 2, characterized that the acid is a monocarboxylic acid, preferably a monoalkanoic acid.

4. The method according to claim 3, characterized in that the acid is selected from the group consisting of formic, acetic and propionic acid.

5. The method according to claim 4, characterized in that the acid is formic acid.

6. The method according to claim 1, characterized in that in step (1) an amount of 1 to 5% by weight of acid (dry weight), calculated as dry substance from the mineral wool, is applied to the mineral wool.

7. The method according to claim 1, wherein in step (2) the resultant mineral wool product is cured at a temperature high enough to evaporate any volatile substances.

8. The method according to claim 2, characterized in that the aqueous solution of the acid contains, emulsified therein, a hydrophobing agent, preferably a silicone oil.

9. The method according to claim 2, characterized in that the aqueous solution of the acid is applied to the mineral wool by spraying, dipping or condensing the same thereon.

10. The method according to claim 1, characterized in that deegree of dissolution of the mineral material from the mineral fibre is monitered by measuring the pH of the mineral wool after application of the acid.

* * * * *